(12) United States Patent
Fukuda (10) Patent No.: US 6,553,400 B1
(45) Date of Patent: Apr. 22, 2003

(54) SUSPEND AND RESUME PROCESSING METHOD FOR SUSPENDING AND RESUMING A PLURALITY OF STATES OF PROGRAMMED OPERATIONS

(75) Inventor: Masaru Fukuda, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/511,770

(22) Filed: Feb. 24, 2000

(30) Foreign Application Priority Data

Feb. 26, 1999 (JP) .......................................... 11-051988

(51) Int. Cl.[7] .............................. G06F 9/00; G06F 15/16
(52) U.S. Cl. ....................... 709/100; 709/102; 709/106; 709/108; 709/201; 709/107
(58) Field of Search ................................. 709/102, 218, 709/201, 314, 101, 106, 108, 107, 100; 707/200; 711/219; 713/300

(56) References Cited

U.S. PATENT DOCUMENTS

| | | | | |
|---|---|---|---|---|
| 4,685,125 A | * | 8/1987 | Zave | 700/1 |
| 5,278,984 A | * | 1/1994 | Batchelor | 709/314 |
| 5,603,020 A | * | 2/1997 | Hashimoto et al. | 707/200 |
| 5,709,607 A | * | 1/1998 | Mowers et al. | 473/58 |
| 5,862,391 A | * | 1/1999 | Salas et al. | 713/300 |
| 6,067,565 A | * | 5/2000 | Horvitz | 709/218 |
| 6,105,119 A | * | 8/2000 | Kerr et al. | 711/219 |
| 6,179,489 B1 | * | 1/2001 | So et al. | 709/102 |

FOREIGN PATENT DOCUMENTS

| | | |
|---|---|---|
| JP | 01-279312 | 11/1989 |
| JP | 05-11894 | 1/1993 |
| JP | 06-175756 | 6/1994 |
| JP | 6-337778 | 12/1994 |
| JP | 7-200112 | 8/1995 |
| JP | 08-314586 | 11/1996 |
| JP | 10-63362 | 3/1998 |

\* cited by examiner

Primary Examiner—John A. Follansbee
Assistant Examiner—Lilian Newgen
(74) Attorney, Agent, or Firm—Sughrue Mion, PLLC (57) ABSTRACT

A suspend and resume processing method for suspending and resuming a plurality of hardware states of program tasks is disclosed. In the suspend operation, a key code designated by the user is recognized to determine one of storage areas in which the hardware execution state of the target task is saved, and data of information on the task, such as the task, a key code designated by the user, a target storage area, and the number of resume operations, are stored in a look-up table. In the resume operation, a list of the data of the look-up table is displayed so that the user can easily select a target task to be resumed, the target task is determined by detecting data input by the user, and necessary data is loaded from the relevant storage area, and the number of resume operations is counted and the data of the look-up table is updated.

3 Claims, 7 Drawing Sheets

| KEY | DATE | TASK NAME | STORAGE AREA | NUMBER OF RESUME OPERATIONS |
|---|---|---|---|---|
| F1 | 1998.12.4 | TASK 1 | STORAGE AREA 1 | 4 |
| F2 | 1998.12.20 | TASK 2 | STORAGE AREA 2 | 1 |
| | | | | |
| | | | | |

SUSPEND AND RESUME PROCESSING METHOD FOR SUSPENDING AND RESUMING A PLURALITY OF STATES OF PROGRAMMED OPERATIONS

BACKGROUND OF THE INVENTION

1. Field of the Invention

The present invention relates to a suspend and resume processing method for suspending execution of a task or the like, and then releasing the suspend state, in particular, one for suspending and resuming the states of a plurality of programmed operations.

This application is based on Patent Application No. Hei 11-51988 filed in Japan, the contents of which are incorporated herein by reference.

2. Description of the Related Art

The conventional suspend and resume function provided in a data processing apparatus such as a computer is provided for reducing the time necessary for the operation of initializing the hardware when the power switch is turned on, or for realizing a system in which even if the power is turned off during the execution of a task and then the power is turned on again, the execution environment before the power-off is maintained and the relevant task can be executed from the interrupted step.

Japanese Unexamined Patent Application, First Publication, No. Hei 1-279312 relates to the resume function which is generally used in a battery-driven personal computer. Hei 1-279312 has an object of providing a computer system for realizing a resume function also in an AC-power-driven personal computer without a built-in battery. The disclosed computer system comprises (i) RESUME mode setting means for setting/resetting a flag for indicating whether the RESUME mode is used (if the mode is on, then the system state immediately before the power-off can be restored), (ii) a power supply which generates a power-off signal after the power-switch is turned off, so as to stop supplying power after a specific elapsed time or according to a request, (iii) data storage means for detecting the Off state of the power switch, checking the above flag, storing system data in a storage file, and informing the power supply of the stopping of the power supply operation, and (iv) system booting (software) means, loaded in the main memory when the power is turned on, for checking the above flag, wherein if the current mode is the RESUME mode, then the system booting means restores relevant data from the storage file, or else the booting means executes a normal activation operation.

Japanese Unexamined Patent Application, First publication, No. Hei 5-11894 discloses a resume processing method in which when the system is shifted to the suspend mode, the user is informed of the possible resume time in the battery mode, and the user is warned of data backup.

However, the above conventional methods have the problem that the states of a plurality of programmed operations cannot be suspended. This is because in the above conventional techniques, the state of a single programmed operation is suspended and then resumed, and thus the relevant system has only a single memory area for storing the state of a programmed operation.

In consideration of the above problem, Japanese Unexamined Patent Application, First publication, No. Hei 10-63362 discloses a method for suspending and resuming the states of a plurality of programmed operations.

SUMMARY OF THE INVENTION

The present invention also aims to realize the suspend and resume operation of the states of a plurality of programmed operations or tasks (i.e., the programmed states), and to provide a method for enabling the user to much more easily and efficiently obtain the desired program environment. That is, an objective of the present invention is to provide a system processing function of suspending and resuming a plurality of programmed states, and to provide a method for displaying a list of the programmed states so that the user can easily select a suspended task to be resumed.

Therefore, the present invention provides a suspend and resume processing method for performing suspend and resume operations by using a data processing apparatus including a power management signal detecting section, a pushed key detecting and storage area selecting section, a save and load processing section, and a counting section; and a storage device including a plurality of storage areas for storing a plurality of hardware execution states of programmed operations, and a look-up table for storing data of information on each program task which has been suspended, wherein the information includes a task name of a target task, a key code of a key designated by a user in the suspend operation, a target storage area for the task, and the number of resume operations of the task, and wherein:

in the suspend operation in which a target hardware execution state of a program task, corresponding to a key code designated by the user, is suspended, said method comprises:

a signal detecting step, executed by the power management signal detecting section, of detecting a power management signal generated according to a user operation;

a key detecting and storage area selecting step, executed by the pushed key detecting and storage area selecting section, of recognizing the key code designated by the user; determining one of the storage areas in which the hardware execution state of the program task to be suspended is stored; and storing the data of information on the relevant program task in the look-up table; and a data saving step, executed by the save and load processing section, of saving data of the target hardware execution state in the determined storage area, and in the resume operation in which a program task which has been suspended is resumed, said method comprises:

a signal detecting step, executed by the power management signal detecting section, of detecting a power management signal generated according to a user operation;

a data displaying and task determining step, executed by the pushed key detecting and storage area selecting section, of displaying the data of the look-up table on a display; and determining the task name of a program task to be resumed by detecting data input by the user;

a data loading step, executed by the save and load processing section, of loading data of the target hardware execution state of the determined program task from the relevant storage area; and a counting step, executed by the counting section, of counting the number of resume operations with respect to the determined program task, and updating the data of information on the number of resume operations in the look-up table.

Accordingly, a plurality of execution states of program tasks can be suspended and resumed. Typically, in the data displaying and task determining step of the resume operation, a list of the data related to the hardware execution states of the program tasks stored in the look-up table is displayed on the display. In this case, the user can easily select a target program task to be resumed.

Preferably, the counting step of the resume operation further comprises arranging the data of the look-up table in a manner such that data are listed in said list in order of the number of resume operations. Accordingly, program tasks which were much more frequently resumed are displayed first, so that the user can much more easily perform the task selecting operation.

DESCRIPTION OF THE PREFERRED EMBODIMENTS

Figure 1:
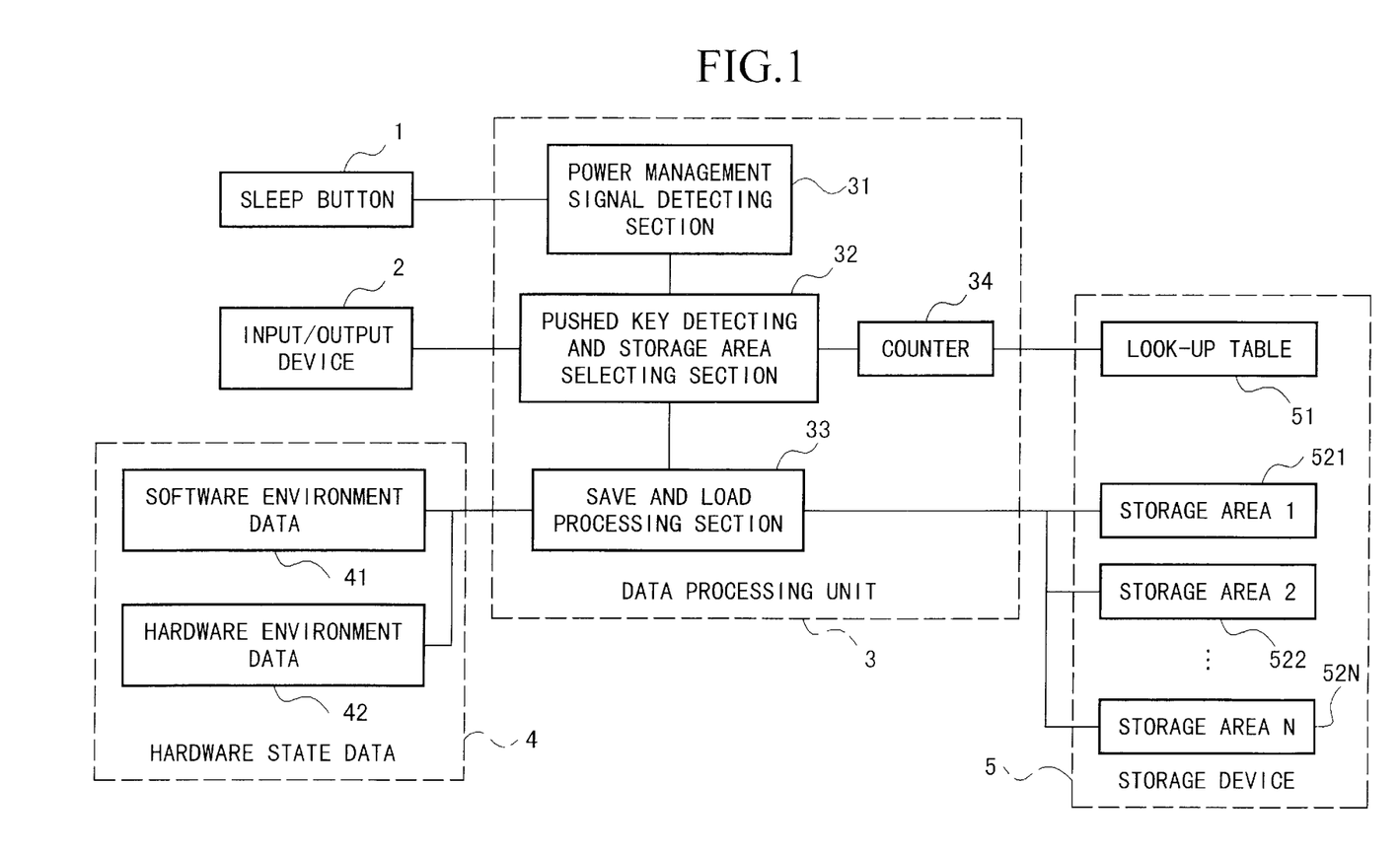
FIG. 1 is a block diagram showing the system structure of the first embodiment according to the present invention.

Hereinafter, the system structure of an embodiment according to the present invention will be explained with reference to FIG. 1. As shown in the figure, this system comprises sleep button 1, input/output device 2 including a keyboard, display, and the like, data processing unit 3 operated by a program control, and storage device 5. Reference numeral 4 indicates hardware state data indicating each operational state of the relevant computer.

The storage device 5 includes look-up table 51 and N storage areas 521 to 52N. The look-up table 51 stores the task name of each program task which has been suspended, the key code of a key which the user pushed in each suspend operation, and the like. The hardware state data 4 related to the suspended task is saved in one of the storage areas 521 to 52N.

The data processing unit 3 has power management signal detecting section 31, pushed key detecting and storage area selecting section 32, save and load processing section 33, and a counting section 34.

The power management signal detecting section 31 detects whether the sleep button 1 has been pushed. In the suspend operation, the pushed key detecting and storage area selecting section 32 determines a key code, relating to a program task to be suspended, based on data input by using the input/output device 2, and stores the key-code data in the look-up table 51. In the resume operation, the pushed key detecting and storage area selecting section 32 displays the data stored in the look-up table 51 by using the input/output device 2, and determines the task name of a task to be resumed, according to data input by using the input/output device 2 and then refers to the look-up table 51 so as to determine a target storage area to be loaded.

In the suspend operation, the save and load processing section 33 saves the hardware state data 4 in one of the storage areas 521 to 52N, which is determined by the pushed key detecting and storage area selecting section 32. In the resume operation, the save and load processing section 33 loads the hardware state data 4 from one of the storage areas 521 to 52N, which is determined by pushed key detecting and storage area selecting section 32. The counting section 34 counts the number (i.e., the accumulated total) of resume operations with respect to the key code of a relevant key (pushed in the resume operation). That is, the number of the resume operations is counted for each key code. The counting section 34 updates the data indicating the number of resume operations in the look-up table 51.

Below, the operation of the present embodiment will be explained in detail. First, the suspend operation will be explained with reference to FIGS. 1 and 2.

Figure 2:
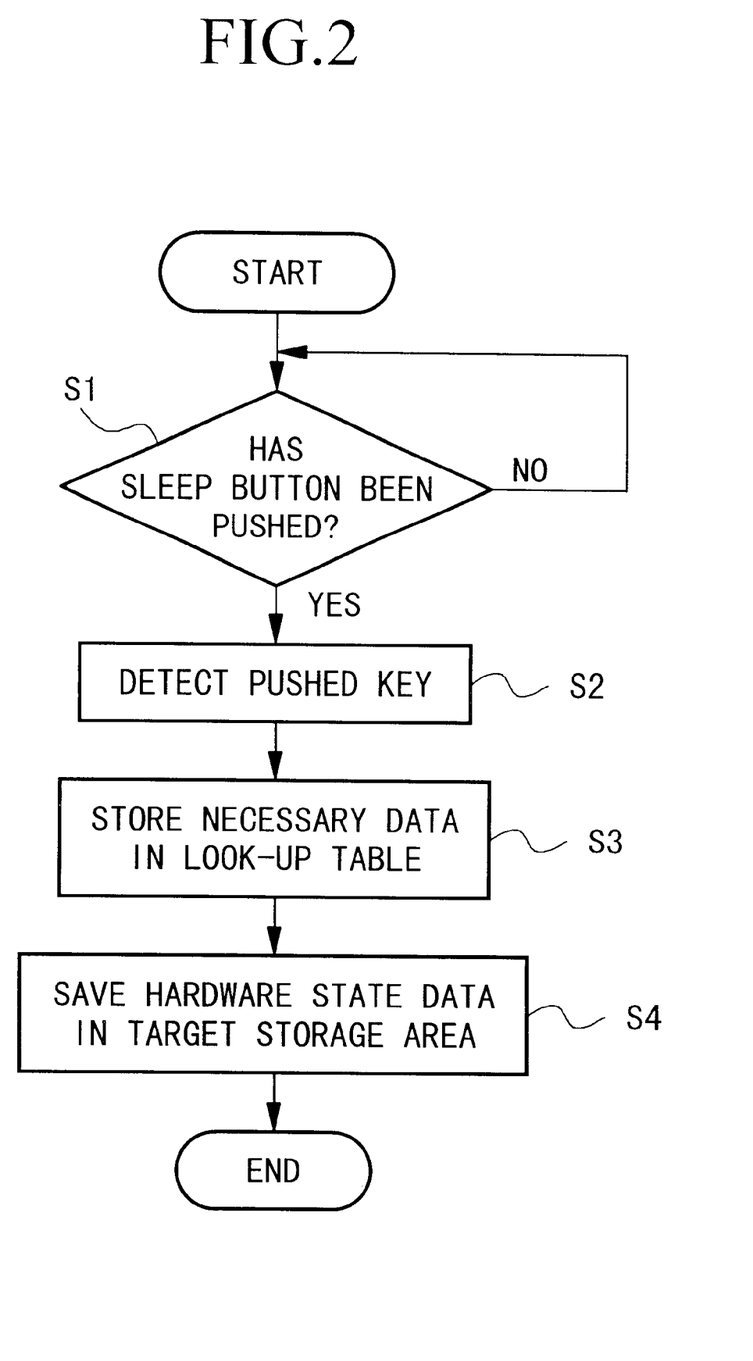
FIG. 2 is a flowchart showing the suspend operation of the first embodiment.

When the sleep button 1 is pushed, a power management signal is generated, and the power management signal detecting section 31 detects the signal (see step S1). Next, the pushed key detecting and storage area selecting section 32 recognizes the key code of a key selected by the user, via the input/output device 2 (see step S2). In addition, the pushed key detecting and storage area selecting section 32 stores necessary data, such as the relevant key code, task name, and the like, in the look-up table 51 (see step S3). The section 32 also determines a target storage area in which the hardware state data 4 is stored, and the save and load processing section 33 saves the data 4 in the determined area (see step S4).

Figure 3:
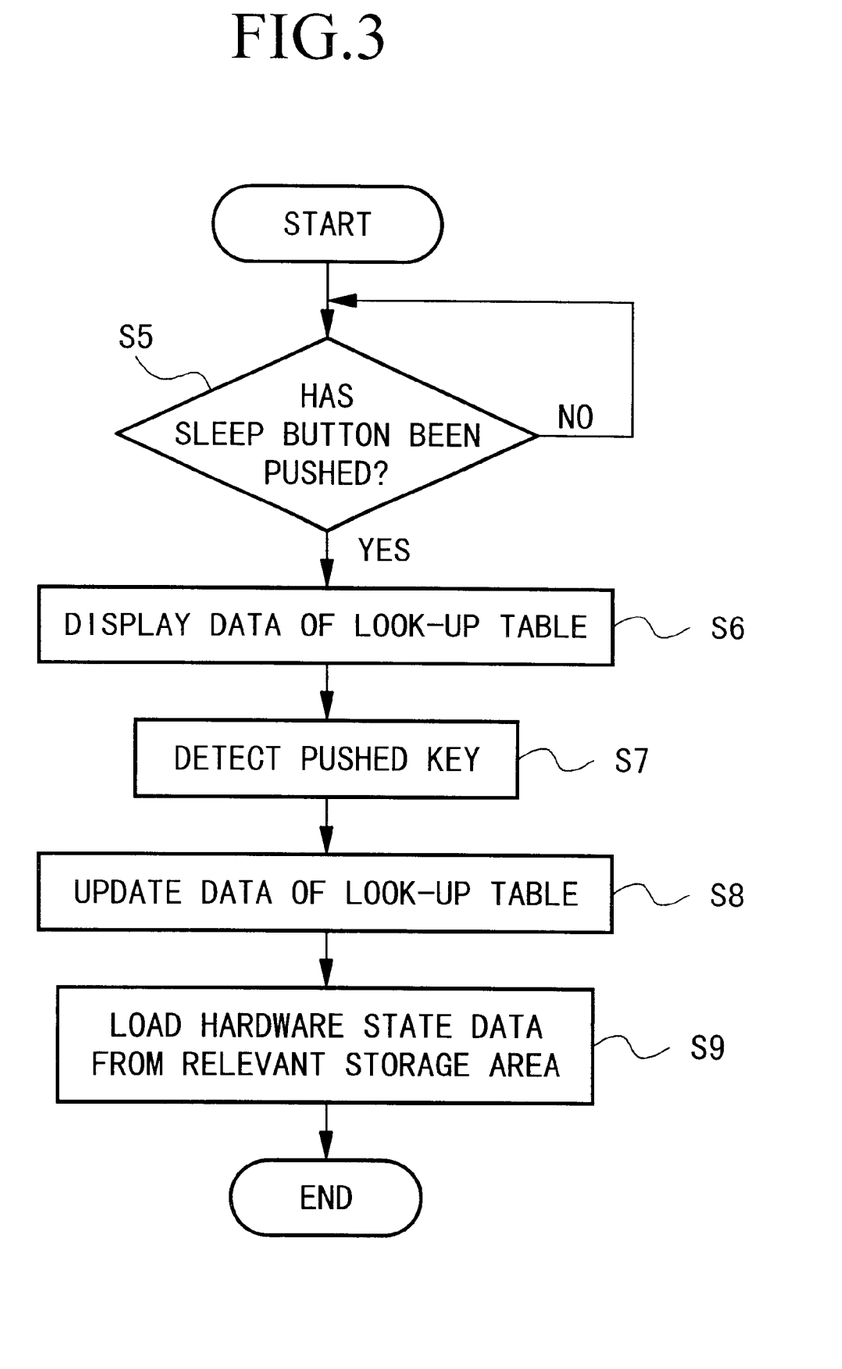
FIG. 3 is a flowchart showing the resume operation of the first embodiment.

Next, the resume operation will be explained with reference to FIGS. 1 and 3.

When the sleep button 1 is pushed, a power management signal is generated, and the power management signal detecting section 31 detects the signal (see step S5). Next, the pushed key detecting and storage area selecting section 32 displays the data in the look-up table 51 on (a display of) the input/output device (see step S6). In addition, the pushed key detecting and storage area selecting section 32 detects data input by the user using the input/output device 2 (see step S7), and determines the task name of a task to be resumed. Here, the counting section 34 counts the number of resume operations with respect to the target task by executing an increment operation, and updates the data stored in the look-up table 51 (see step S8). The save and load processing section 33 also loads the hardware state data 4 from the relevant storage area (i.e., one of the areas 521 to 52N) (see step S9).

The operation of the present embodiment will be explained in further detail by showing a specific example with reference to the drawings. Here, the resume operation will be explained.

Figure 4:
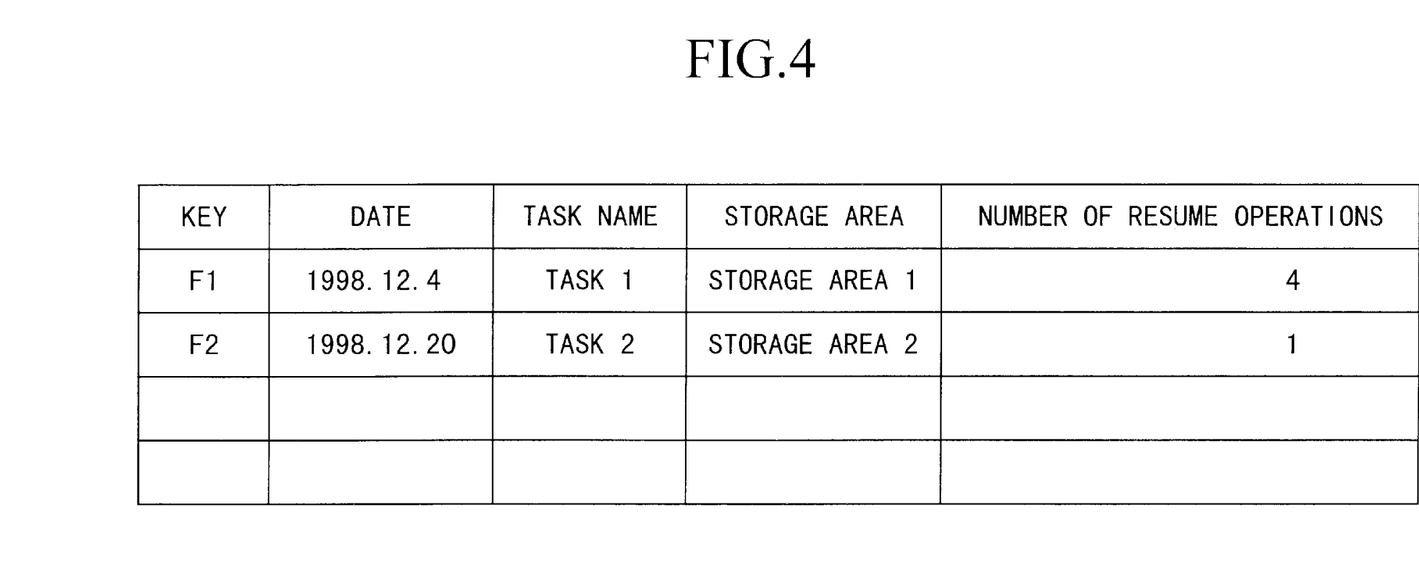
FIG. 4 is a diagram showing an example of the look-up table shown in FIG. 1.

In this example, the look-up table 51 has the format as shown in FIG. 4, and it is assumed that data shown in FIG. 4 are stored in each data item. That is, each entry data of the look-up table 51 consists of the key (code), date, task name, storage area, and the number of resume operations. For example, task 1 has information: key code=F1, date= 1998.12.4 (year.month.date), storage area=storage area 1, and the number of resume operations=4, while task 2 has information: key code=F2, date=1998.12.20, storage area= storage area 2, and the number of resume operations=1.

In the operation, the power management signal generated by pushing the sleep button 1 is detected by the power management signal detecting section 31 (see step S5). Next, the data of the look-up table 51 is displayed by the pushed key detecting and storage area selecting section 32 on (a display of) the input/output device 2 (see step S6). The data input by the user via the input/output device 2 is detected (see step S7), and the task name of a task to be resumed is determined. If the data input by the user indicates key F2, then the task 2 is determined and the number "1" of the resume operations is increased by 1 by the counting section 34 and the result (i.e., 2) of the increment operation is stored in the look-up table 51 as updated data (see step S8). In addition, the hardware state data 4 is loaded from the relevant storage area 2 (see reference numeral 522 in FIG. 1) (see step S9).

Figure 5:
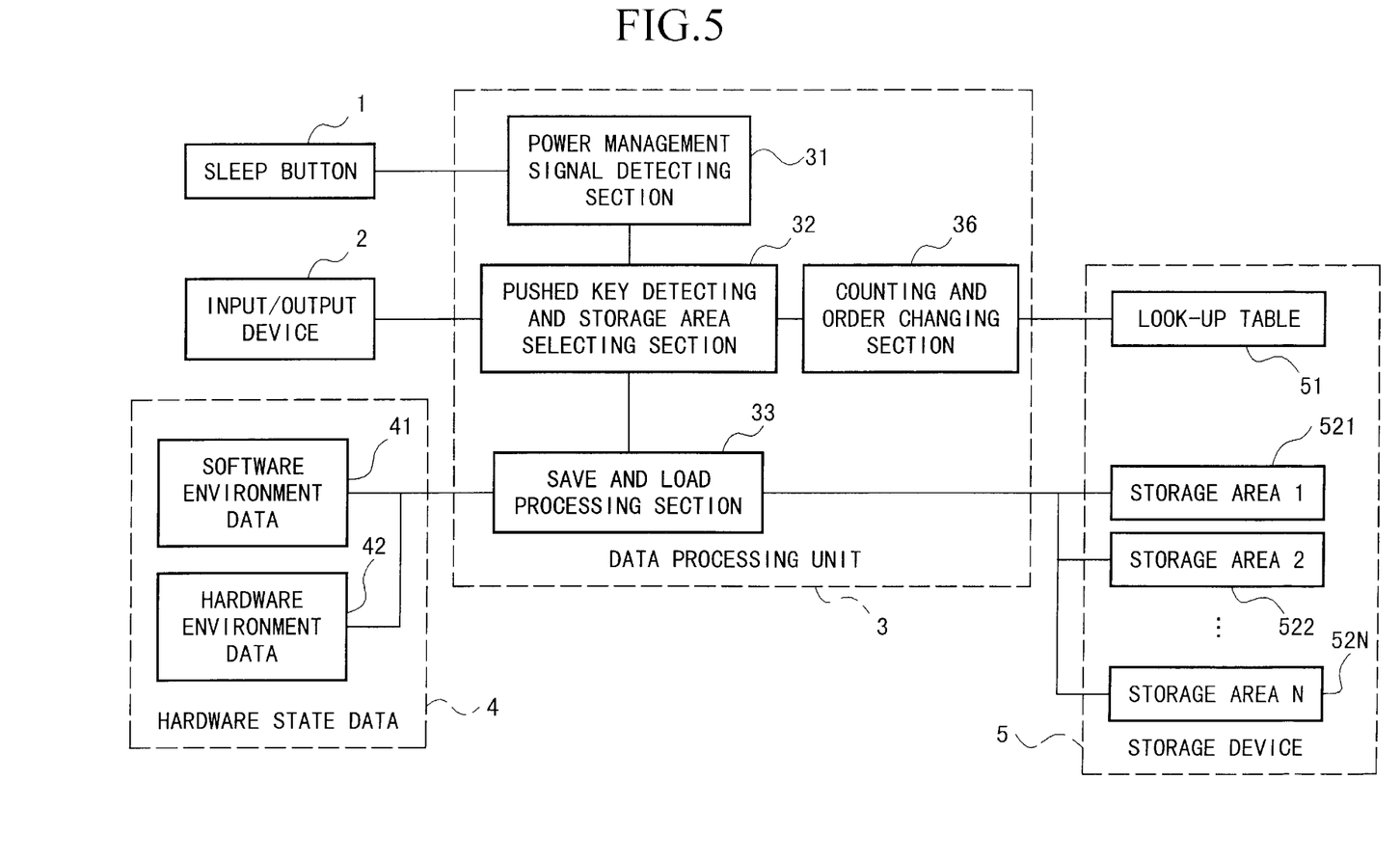
FIG. 5 is a block diagram showing the system structure of the second embodiment according to the present invention.

Below, another embodiment (i.e., second embodiment) according to the present invention will be explained in detail with reference to FIG. 5. In FIG. 5, parts identical or corresponding to those in FIG. 1 are given identical reference numbers. Also in the present embodiment, the system comprises sleep button 1, input/output device 2 including a keyboard, display, and the like, data processing unit 3 operated by a program control, and storage device 5. Reference numeral 4 indicates hardware state data indicating the operational states of the relevant computer.

The internal structure and function of the storage device 5 are the same as those of the above first embodiment.

The data processing unit 3 of the second embodiment has power management signal detecting section 31, pushed key detecting and storage area selecting section 32, save and load processing section 33, and a counting and order changing section 36.

The structures and functions of the power management signal detecting section 31, pushed key detecting and storage area selecting section 32, save and load processing section 33 are the same as those of the above first embodiment. The counting and order changing section 36 counts the number (i.e., the accumulated total) of resume operations with respect to the key code of a relevant key (pushed in the resume operation). The counting and order changing section 36 also arranges the order of records according to the data of the look-up table, in a manner such that the records are listed in order of the number of resume operations.

Below, the operation of the second embodiment will be explained detail.

Figure 6:
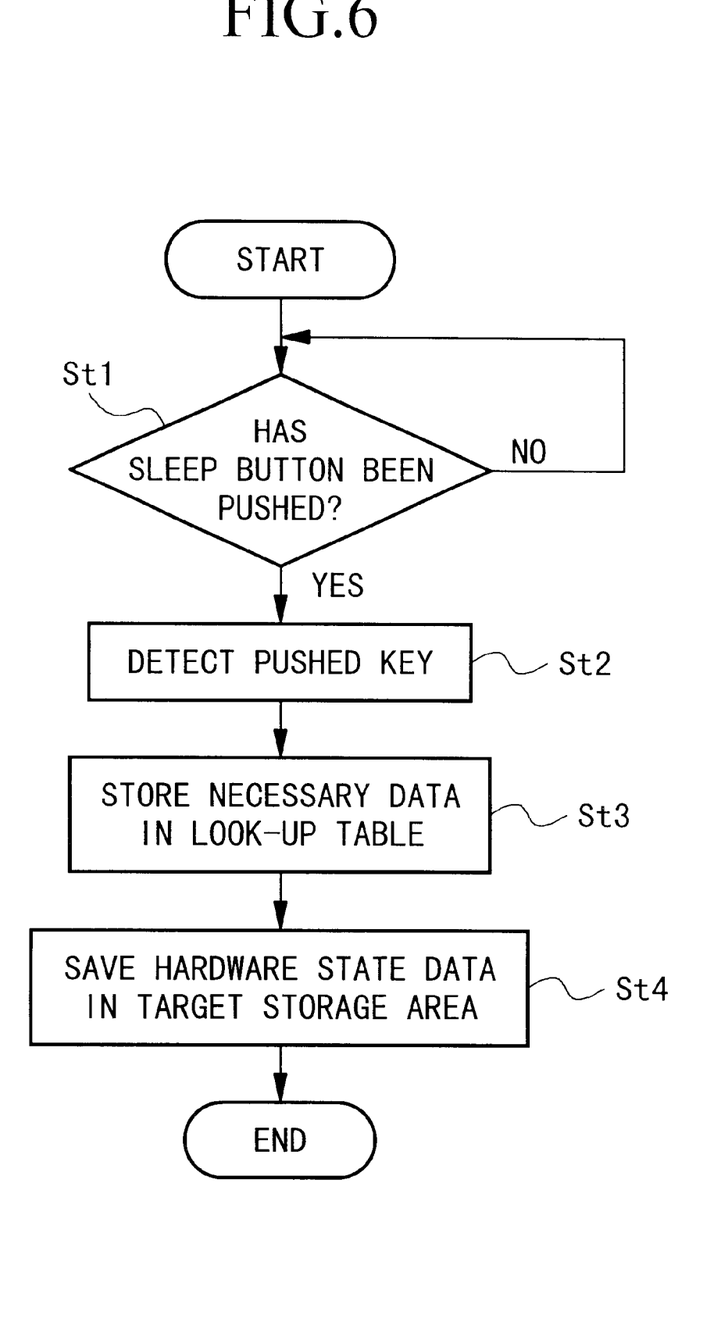
FIG. 6 is a flowchart showing the suspend operation of the second embodiment.

FIG. 6 is a flowchart showing the suspend operation. As shown in the flowchart, the suspend operation is the same as that performed in the first embodiment; thus, explanations thereof are omitted here.

Figure 7:
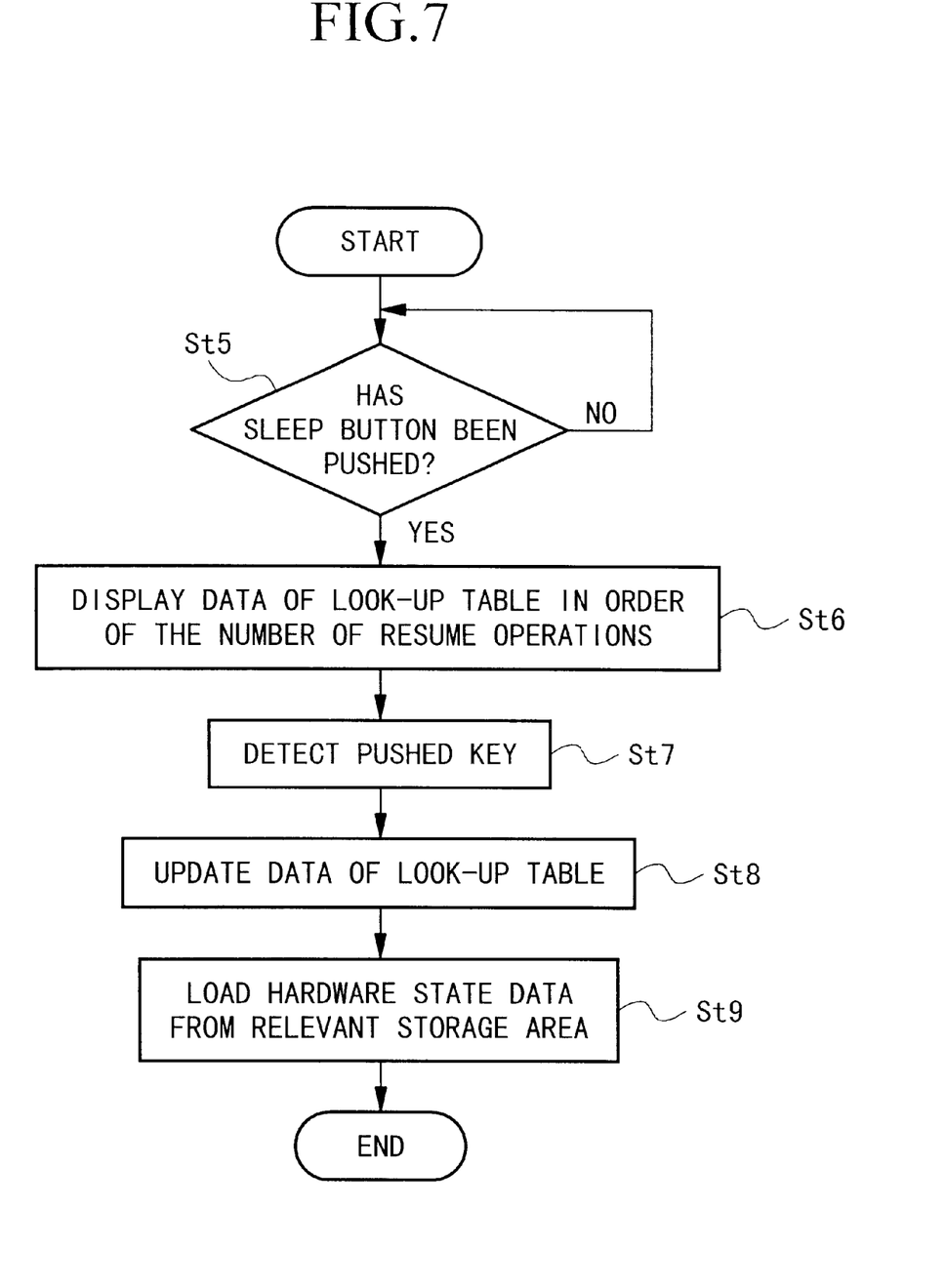
FIG. 7 is a flowchart showing the resume operation of the second embodiment.

FIG. 7 is a flowchart showing the resume operation. When the sleep button 1 is pushed, a power management signal is generated, and the power management signal detecting section 31 detects the signal (see step St5). Next, the pushed key detecting and storage area selecting section 32 displays the data of the look-up table 51 on (a display of) the input/output device (see step St6). In addition, the pushed key detecting and storage area selecting section 32 detects data input by the user using the input/output device 2 (see step St7), and determines the task name of a task to be resumed. Here, the counting and order changing section 36 counts the number of resume operations with respect to the target task by executing an increment operation, and updates the data stored in the look-up table 51, and the order of the recorded data is changed (or updated) in order of the number of resume operations (i.e., the entry having a higher number appears earlier) (see step St8). The save and load processing section 33 also loads the hardware state data 4 from the relevant storage area (i.e., one of the areas 521 to 52N) (see step St9).

The operation of the present embodiment will be explained in further detail by showing a specific example with reference to the drawings. Here, the resume operation will be explained.

In this example, the look-up table 51 has a format as shown in FIG. 4, that is, the same format as that used in the first embodiment, and the same example data are also assumed here. The basic operation is the same as that explained in the above corresponding example in the first embodiment. Here, it is also assumed that the data input by the user indicates key F2, and thus the task 2 is determined. In this case, the number "1" of the resume operations is increased by 1 by the counting and order changing section 36 and the result (i.e., 2) of the increment operation is stored in the look-up table 51 as updated data. Here, if it is further assumed that the number of the resume operations of task 2 is more than 4, that is, larger than the number "4" of the resume operations of task 1, then the record order of the table is changed such that the records of task 1 and task 2 are exchanged so as to show the record of task 2 first (see step St8). In addition, the hardware state data 4 is loaded from the relevant storage area 2 (see reference numeral 522 in FIG. 5) (see step St9).

What is claimed is:

1. A suspend and resume processing method for performing suspend and resume operations by using a data processing apparatus including a power management signal detecting section, a pushed key detecting and storage area selecting section, a save and load processing section, and a counting section; and a storage device including a plurality of storage areas for storing a plurality of hardware execution states of programmed operations, and a look-up table for storing data of information on each program task which has been suspended, wherein the information includes a task name of a target task, a key code of a key designated by a user in the suspend operation, a target storage area for the task, and the number of resume operations of the task, and wherein:

in the suspend operation in which a target hardware execution state of a program task, corresponding to a key code designated by the user, is suspended, said method comprises:

a signal detecting step, executed by the power management signal detecting section, of detecting a power management signal generated according to a user operation;

a key detecting and storage area selecting step, executed by the pushed key detecting and storage area selecting section, of recognizing the key code designated by the user; determining one of the storage areas in which the hardware execution state of the program task to be suspended is stored; and storing the data of information on the relevant program task in the look-up table; and a data saving step, executed by the save and load processing section, of saving data of the target hardware execution state in the determined storage area, and in the resume operation in which a program task which has been suspended is resumed, said method comprises:

a signal detecting step, executed by the power management signal detecting section, of detecting a power management signal generated according to a user operation;

a data displaying and task determining step, executed by the pushed key detecting and storage area selecting section, of displaying the data of the look-up table on a display; and determining the task name of a program task to be resumed by detecting data input by the user;

a data loading step, executed by the save and load processing section, of loading data of the target hardware execution state of the determined program task from the relevant storage area; and a counting step, executed by the counting section, of counting the number of resume operations with respect to the determined program task, and updating the data of information on the number of resume operations in the look-up table.

2. A suspend and resume processing method as claimed in claim 1, wherein in the data displaying and task determining step of the resume operation, a list of the data related to the hardware execution states of the program tasks stored in the look-up table is displayed on the display.

3. A suspend and resume processing method as claimed in claim 2, wherein the counting step of the resume operation further comprises arranging the data of the look-up table in a manner such that data are listed in said list in order of the number of resume operations.

* * * * *